(12) United States Patent
Fujita

(10) Patent No.: US 9,059,468 B2
(45) Date of Patent: Jun. 16, 2015

(54) POSITIVE ELECTRODE COLLECTOR FOR LEAD ACID STORAGE BATTERY AND METHOD FOR PRODUCING THE SAME

(75) Inventor: Kohei Fujita, Takatsuki (JP)

(73) Assignee: GS YUASA INTERNATIONAL, Kyoto-shi (JP)

( * ) Notice: Subject to any disclaimer, the term of this patent is extended or adjusted under 35 U.S.C. 154(b) by 1317 days.

(21) Appl. No.: 12/063,340

(22) PCT Filed: Aug. 7, 2006

(86) PCT No.: PCT/JP2006/315605
§ 371 (c)(1),
(2), (4) Date: Feb. 8, 2008

(87) PCT Pub. No.: WO2007/018183
PCT Pub. Date: Feb. 15, 2007

(65) Prior Publication Data
US 2009/0130557 A1    May 21, 2009

(30) Foreign Application Priority Data
Aug. 8, 2005  (JP) ................. 2005-229826

(51) Int. Cl.
| | |
|---|---|
| *H01M 4/14* | (2006.01) |
| *H01M 4/66* | (2006.01) |
| *H01M 4/68* | (2006.01) |
| *H01M 10/06* | (2006.01) |
| *H01M 4/16* | (2006.01) |
| *C21D 1/70* | (2006.01) |
| *H01M 4/02* | (2006.01) |

(52) U.S. Cl.
CPC ............. *H01M 4/661* (2013.01); *H01M 4/664* (2013.01); *H01M 4/667* (2013.01); *H01M 4/68* (2013.01); *H01M 10/06* (2013.01); *H01M 2004/028* (2013.01); *Y02E 60/126* (2013.01)

(58) Field of Classification Search
USPC .......................................................... 148/537
See application file for complete search history.

(56) References Cited

U.S. PATENT DOCUMENTS 4,502,936 A * 3/1985 Hayfield .................. 204/290.08
4,861,689 A * 8/1989 Clough et al. ................ 429/210

FOREIGN PATENT DOCUMENTS

| JP | 57-42935 B2 | 9/1982 | |
|---|---|---|---|
| JP | 07065821 A * | 3/1995 | ............. H01M 4/14 |
| JP | 9-283151 A | 10/1997 | |
| JP | 3482605 B2 | 12/2003 | |

OTHER PUBLICATIONS

International Search Report of PCT/JP2006/315805, date of mailing Nov. 21, 2006.
Japanese Office Action dated Sep. 4, 2012, issued in corresponding Japanese Patent Application No. 2006-527791, (3 pages).

* cited by examiner

*Primary Examiner* — Rebecca Lee
(74) *Attorney, Agent, or Firm* — Westerman, Hattori, Daniels & Adrian, LLP

(57) ABSTRACT

A positive electrode current collector for lead-acid batteries contains a current collector substrate of titanium or a titanium alloy, a coating of titanium oxide formed on the surface of the current collector substrate, and a conductive ceramic layer formed on the surface of the coating, and the thickness of the coating is 0.09 μm or thinner.

4 Claims, 5 Drawing Sheets

POSITIVE ELECTRODE COLLECTOR FOR LEAD ACID STORAGE BATTERY AND METHOD FOR PRODUCING THE SAME

BACKGROUND OF THE INVENTION

1. Field of the Invention

The invention relates to a positive electrode current collector containing a conductive ceramic layer formed on the surface of a current collector substrate of titanium or a titanium alloy and a production method thereof.

2. Description of the Related Art

New materials in place of lead or lead alloy to be used for positive electrode current collectors for lead-acid batteries have been investigated. The materials are required to have high conductivity, insolubility in electrolyte solutions, electrochemical stability in electrolytic solutions, and high oxygen overvoltage. Conductive ceramics made of metal oxides, metal silicides, and the like have been known as those which satisfy these requirements. For example, there are $SnO_2$, $Ti_xTa_{(1-x)}O_2$, $TiSi_2$, $TiSi_3$, $Ti_5Si_3$, $TaSi_2$, $NbSi_2$, $Nb_5Si_3$, and $Ti_4O_7$.

However, positive electrode current collectors cannot be produced only from materials of these conductive ceramics. It is because the volume specific resistivity of such conductive ceramics is 10 Ω·cm or lower, however it is still too high as compared with those of common metals ($10^{-6}$ to $10^{-5}$ Ω·cm or lower).

Therefore, it is proposed that conductive ceramic layers are formed on the surfaces of current collector substrates of titanium or titanium alloys to provide positive electrode current collectors of lead-acid batteries (e.g., Electrochemistry, Vol. 47 (668), the Electrochemical Society of Japan, 1979, and Electrochemistry, Vol. 48 (384), the Electrochemical Society of Japan, 1980). These positive electrode current collectors are obtained by coating conductive ceramics such as $SnO_2$ (Sb-doped), $PtO_x$, $IrO_2$, and $RuO_2$ on the surface of titanium and further coating β-PbO2 on the surface.

Further, also proposed are lead dioxide electrodes to be used for DSA electrodes for electrolysis which are produced by coating surfaces of current collector substrates of titanium or titanium alloy with conductive ceramics made of $PtO_x$ and further with α-$PbO_2$ and β-$PbO_2$ (e.g. reference to Japanese Patent Application Laid-Open (JP-A) No. 63-57791).

As described in these Documents, in the case where titanium provided with a conductive ceramic layer on the surface is used as a positive electrode current collector, since the conductivity of titanium is sufficiently high as compared with that of the conductive ceramic, the conductivity of the positive electrode current collector is ensured. Further, since titanium has high corrosion resistivity, it is basically hard to be dissolved in diluted sulfuric acid, which is an electrolyte solution. Moreover, if a conductive ceramic layer is formed, dissolution of titanium does not become a problem. Further, since titanium has a high melting point, titanium can stand high temperature around 500° C. in a step of forming the conductive ceramic layer. Titanium also has a characteristic that it is made passivated, however the passivation can be prevented by coating of titanium with the conductive ceramic layer and therefore, the passivation does not either become a problem. Further, since titanium is more economical than conductive ceramics, the material cost can be saved.

Because of the above-mentioned reasons, investigations on titanium or titanium alloys provided with conductive ceramics on the surface have been made.

SUMMARY OF THE INVENTION

However, in the case where a lead-acid battery is produced using a positive electrode current collector for lead-acid batteries produced by forming a conductive ceramic layer on the surface of a current collector substrate of titanium or a titanium alloy, there was a problem that the inner resistance of the lead-acid battery is high. Therefore, it resulted in a problem such that the high rate discharge capacity of the lead-acid battery is not so good.

Inventors of the present invention investigated on reasons for the above-mentioned problems and it was found that a coating of titanium oxide between the current collector substrate of titanium or titanium alloy and the conductive ceramic layer was a cause. That is, since titanium oxide with a low conductivity existed between the current collector substrate of titanium or titanium alloy and the conductive ceramic layer, the resistivity of the positive electrode current collector became high, which leads to a large internal resistivity of a lead-acid battery. It is supposed that this coating of titanium oxide is produced by oxidation of the surface layer part of the current collector substrate of titanium or titanium alloy at the time of firing in the step of forming the conductive ceramic layer on the current collector substrate of titanium or a titanium alloy.

In consideration of the above-mentioned problems and causes, the invention has been completed.

(A) The present invention is characterized in that with respect to a positive electrode current collector for lead-acid batteries provided with a current collector substrate of titanium or titanium alloy, a coating of titanium oxide formed on the surface of the positive electrode current collector, and a conductive ceramic layer formed on the surface of the coating, the thickness of the coating of titanium alloy oxide is 0.09 μm or thinner.

According to the invention, the coating of titanium oxide formed between the current collector substrate and the conductive ceramic layer is sufficiently thin. Therefore, the electric resistivity is lowered. Accordingly, in the case where a lead-acid battery is produced using above mentioned positive electrode current collector, the lead-acid battery becomes excellent in the high rate discharge capability.

Herein, generally, the chemical formula of titanium oxide is expressed as $TiO_2$. However, with respect to titanium oxide described in this specification, the stoichiometric ratio of titanium and oxygen is not necessarily limited to be 1:2. Therefore, titanium oxide, which is a component of the coating, is expressed as $TiO_x$ in the present invention. In this case, x is higher than 0 and 2 or lower.

The thickness of the coating of titanium oxide can be measured by Markus type high frequency glow discharge optical emission spectroscopy (hereinafter, referred to as GD-OES analysis). A practical method and conditions for the measurement will be described along with FIG. 3 in this specification in (2.1.4) Embodiments.

In the case where the thickness of the coating of titanium oxide is 0.09 μm or thinner, it is easy for a person skilled in the art to have an idea that the electric resistivity becomes smaller as the thickness becomes thinner.

Conductive ceramics are ceramics obtained by firing metal compounds such as metal oxides or metal silicides at a high temperature and having a volume specific resistivity of 10 Ω.cm or less. The conductive ceramic layer may be formed from only one layer or a layer and an other layer containing α-$PbO_2$, β-$PbO_2$, etc. formed thereon. Even in such a case, the effect to improve the high rate discharge capability of the invention can be caused.

(B) The invention is characterized in that with respect a production method of a positive electrode current collector for lead-acid batteries, the production method includes a first step of annealing a current collector substrate of titanium or titanium alloy in vacuum or inert atmosphere and a second step of forming a conductive ceramic layer on the surface of the current collector substrate treated in the first step.

According to the invention, as described in (A), a positive electrode current collector for lead-acid batteries with a coating thickness of 0.09 μm or thinner can be produced. That is, before the conductive ceramic layer is formed on the current collector substrate of titanium or a titanium alloy, the current collector substrate of titanium or titanium alloy is annealed in vacuum or inert atmosphere. Therefore, due to the recrystallization caused along with the annealing, the crystal strains of titanium or the titanium alloy are released to increase the crystallinity of titanium or titanium alloy.

Accordingly, even if being heated at a high temperature (e.g. 500° C.) during the process of forming the conductive ceramic layer on the current collector substrate, the coating of titanium oxide is hardly formed on titanium or the titanium alloy. As a result, the electric resistivity between the current collector substrate and the conductive ceramic layer is lowered. In the case where a lead-acid battery is produced using the current collector substrate, high rate discharge capability of the lead-acid battery is made excellent.

Herein, vacuum means vacuum to an extent that the coating of titanium oxide is scarcely formed on titanium or titanium alloy during the annealing. Consequently, vacuum in this specification is preferably high degree vacuum, however it is not necessarily required. In Examples of the present invention, as described below, vacuum was adjusted to be as low as $1 \times 10^{-4}$ Pa. The inert atmosphere means the atmosphere filled with a gas which does not cause reaction with titanium or titanium alloy and thus does not form the oxide coating or the atmosphere in which such as gas is sufficiently circulated.

The temperature for annealing may be a proper temperature at which the crystal strains of the current collector substrate are released, and is not limited. Further, in the annealing step, a process such that the temperature for annealing is changed with the lapse of time may be included. In Embodiments of the invention, annealing at 700° C. for 12 hours is mainly exemplified.

Herein, in the second step, the firing step is included. That is, the second step for forming the conductive ceramic layer includes a step of firing the current collector substrate such as a dip coating method or a spray thermal decomposition method. These dip coating method and the spray thermal decomposition method will be described in detail later.

(C) The invention is characterized in that in the above-mentioned production method, the half width of the peak with the maximum intensity in the XRD pattern of the titanium or the titanium alloy is adjusted to be 0.38° or lower in the first step. In the above-mentioned production method, when four peaks are selected in the order of highest intensities in the XRD pattern of the titanium or the titanium alloy, the total value of intensities of the four peaks is controlled to be 85% or higher in the total value of the intensities of all peaks by the above-mentioned first step.

According to the invention, the crystallinity of the surface of the current collector substrate is sufficiently heightened and the crystal strains are reliably released. Accordingly, even if the current collector substrate is heated at a high temperature for forming the conductive ceramic layer, the coating of titanium oxide is hardly formed. Consequently, the electric resistivity between the current collector substrate and the conductive ceramic layer is lowered.

Herein, "all peaks" mentioned in claims of the present invention is defined as diffraction peaks attributed to (100) plane, (002) plane, (101) plane, (102) plane, (110) plane, (103) plane, (200) plane, (112) plane, and (201) plane of titanium in the case where the current collector substrate is titanium. They are diffraction peaks appearing in the case of scanning from 20° to 80° of 2θ in XRD measurement. In the case where the current collector substrate is a titanium alloy, they are diffraction peaks which appear in the case of scanning from 20° to 80° of 2θ and have 1% or higher intensity ratio to the peak having the maximum intensity in XRD measurement.

(D) The invention is characterized in that with respect to a positive electrode current collector for lead-acid batteries provided with a current collector substrate of titanium or titanium alloy and a conductive ceramic layer, the conductive ceramic layer is formed on the surface of the current collector substrate, and in the XRD pattern of the positive electrode current collector, the half width of the peak with the maximum intensity among the peaks of titanium or titanium alloy is adjusted to be 0.38° or lower.

Further, the invention is characterized in that with respect to a positive electrode current collector for lead-acid batteries provided with a current collector substrate of titanium or titanium alloy and a conductive ceramic layer, the conductive ceramic layer is formed on the surface of the current collector substrate, and in the XRD pattern of the positive electrode current collector, when four peaks are selected in the order of highest intensities among peaks of the titanium or the titanium alloy, the total value of intensities of the four peaks is controlled to be higher than 85% in the total value of the intensities of all peaks.

According to the invention, with respect to the positive electrode current collector, no thick coating of titanium oxide is formed between the current collector substrate and the conductive ceramic layer. Therefore, the electric resistivity between the current collector substrate and the conductive ceramic layer is lowered.

(E) The invention is characterized in that a lead-acid battery is provided with the above-mentioned positive electrode current collector. Further, the invention is characterized in that a lead-acid battery provided with the above-mentioned positive electrode current collector is disposed in an uninterruptible power supply.

The lead-acid battery and the uninterruptible power supply of the invention are excellent in the high rate discharge capability.

(F) The invention is characterized in that with respect a production method of a lead-acid battery provided with a positive electrode current collector, a production method of the above-mentioned positive electrode current collector is the production method described above-mentioned. The invention is characterized in that with respect a production method of an uninterruptible power supply containing a lead-acid battery provided with a positive electrode current collector, a production method of the above-mentioned positive electrode current collector is the production method described above-mentioned.

The lead-acid battery produced by the method of the invention is excellent in high rate discharge capability. The uninterruptible power supply produced by the method of the invention is excellent in high rate discharge capability.

(G) The invention is characterized in that with respect to a positive electrode current collector for lead-acid batteries provided with a current collector substrate of titanium or titanium alloy and a conductive ceramic layer, crystal of titanium or titanium alloy is selectively oriented to four or less crystal planes.

In this specification, "selectively oriented to four or less crystal planes" means that in XRD pattern, when the peaks are selected in order of the highest intensities and the total value of the intensities of the selected peaks reaches at first 85% or higher of the total value of the intensities of all peaks, the number of the selected peaks is 4 or lower (including 4). In other words, in the case where even if 4 peaks are selected in order of the highest intensities, the total value of the intensities of the 4 peaks does not reach 85% of the total value of the intensities of all peaks, the current collector substrate having such a XRD pattern cannot be included in substrates satisfying "selectively oriented to four or less crystal planes"

According to the invention, since crystal strain of the current collector substrate is released, no thick coating of titanium oxide is formed between the current collector substrate and the conductive ceramic layer. Consequently, the electric resistivity between the current collector substrate and the conductive ceramic layer can be lowered.

In the case where the current collector substrate is titanium, the crystal of titanium is preferable to be oriented selectively to three planes; (101) plane, (102) plane, and (103) plane. These three kind crystal planes are examples of the crystal planes which can reliably improve the high rate discharge capability.

(H) The invention is based on the patent application (Japanese Patent Application No. 2005-229826) filed to Japan Patent Office on Aug. 8, 2005, and the disclosure of which is incorporated by reference in its entirety.

DETAILED DESCRIPTION OF THE PREFERRED EMBODIMENTS (1) At first, an analysis method of titanium or titanium alloy to form a current collector substrate will be described. The crystal state (orientation state of the surface and the half width of peaks) of titanium and titanium alloy is analyzed by an X-ray diffraction apparatus using CuK α-ray. Specifically, while X-ray with prescribed wavelength is radiated to titanium or titanium alloy at impingent angle θ and scanned in a range of 20° to 80° of 2θ, and the intensity of diffracted X-ray in the range is counted. So-called X-ray diffraction pattern (XRD pattern) is obtained by plotting 2θ in the abscissa axis and X-ray intensity in the ordinate axis. Accordingly, based on the crystal structure of titanium and wavelength of radiated X-ray, the type of the crystal plane corresponding to a diffraction angle 2θ at which a peak of the X-ray diffraction intensity appears can be specified.

As reference, based on ICDD (International Center for Diffraction Data) card, which is collective XRD data, the correlation of the diffraction angle 2θ and the crystal plane of titanium is shown in Table 1.

TABLE 1

| 2θ (deg.) | Crystal plane |
|---|---|
| 35.06 | (100) |
| 38.40 | (002) |
| 40.15 | (101) |
| 53.01 | (102) |
| 62.96 | (110) |
| 70.66 | (103) |
| 74.26 | (200) |
| 76.30 | (112) |
| 77.32 | (201) |

(2) Hereinafter, Embodiments 1 and 2 of the invention will be described with reference to FIG. 1 to FIG. 9.

(2.1) Embodiment 1

(2.1.1) Rolling

In Embodiment 1, pure titanium (JIS 1 type) is used as a current collector substrate. A plate type pure titanium is cold rolled to obtain a 0.1 mm-thick sheet. Cold rolling means rolling carried out at recrystallization temperature or lower (generally normal temperature) of the metal. In Embodiment 1, cold rolling is described, however it is only an example. Accordingly, the processing method may be other rolling methods and methods other than rolling. Further, in Embodiment 1, a plate type current collector substrate is exemplified, however it is only one example. The structure of the current collector substrate is arbitrary and may be, for example, lattice type.

Figure 1:
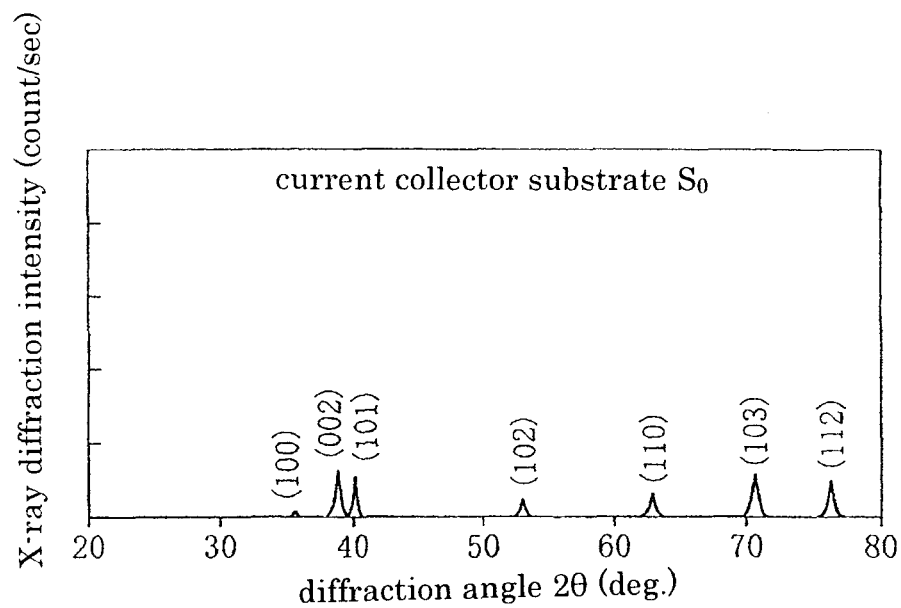
FIG. 1 is an XRD pattern of a current collector substrate $S_0$ of titanium before annealing treatment.

The XRD measurement is carried out for the current collector substrate (hereinafter referred to as current collector substrate $S_0$) after the cold rolling. The XRD pattern by the measurement is shown in FIG. 1. Referring to FIG. 1 and Table 1, it is confirmed that titanium of $S_0$ has 7 crystal planes in total; (100) plane, (002) plane, (101) plane, (102) plane, (110) plane, (103) plane, and (112) plane. Since there are a large number of peaks in the XRD pattern of FIG. 1, titanium of $S_0$ is oriented in many kinds of crystal planes and the crystal orientation of titanium is uneven. Further, since the intensities of the peaks are relatively small and the half widths are wide, the crystallinity of the surface of the current collector substrate $S_0$ is low. It is supposed because many crystal strains formed at the time of cold rolling process remain.

(2.1.2) Annealing

The current collector substrate $S_0$ is annealed at pressure (low vacuum) of $1 \times 10^{-4}$ Pa and 700° C. The annealing duration is set to be 3 hours, 6 hours, and 12 hours. The obtained current collector substrates are respectively called as current collector substrates $S_1$, $S_2$, and $S_3$. Since the annealing is carried out under low vacuum, titanium is not oxidized at the time of annealing.

XRD measurement is carried out for the current collector substrates $S_1$, $S_2$, and $S_3$. The plane indexes of peaks with the maximum intensity and the half widths of the peaks in the respective XRD patterns are shown in Table 2. Table 2 also shows the results of the current collector substrate $S_0$ for which annealing treatment duration is 0 hour (as Comparative Example).

TABLE 2

|  |  | Annealing duration | Plane indexes of peak with the maximum intensity | Half width |
|---|---|---|---|---|
| Comparative Example | $S_0$ | 0 hour | (002) | 0.48° |
| Example 1 | $S_1$ | 3 hours | (103) | 0.41° |
| Example 2 | $S_2$ | 6 hours | (103) | 0.38° |
| Example 3 | $S_3$ | 12 hours | (103) | 0.26° |

The half width of the peak with the maximum intensity is narrowed by annealing. Further, as the annealing duration is longer, the half width of the peak is narrowed. According to these results, the following are found that the crystal strains existing in the current collector substrate $S_0$ are removed by recrystallization at the time of annealing and that the removal of the stains is promoted corresponding to the duration of the annealing. In the case where it is desired to adjust the half width of the peak with the maximum intensity, the annealing duration and temperature may be adjusted. For example, in the case where the half width is narrowed, the annealing duration may be prolonged.

Figure 2:
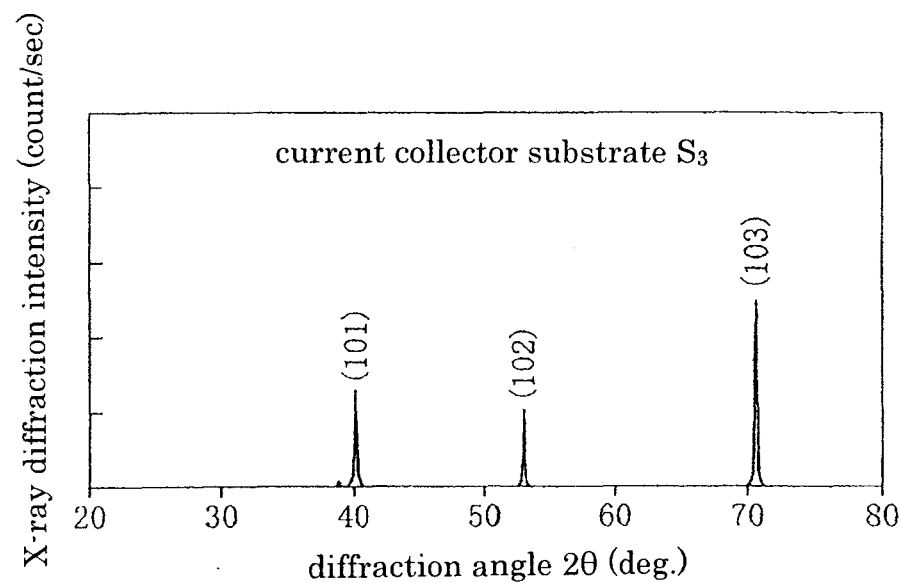
FIG. 2 is an XRD pattern of a current collector substrate $S_3$ obtained by carrying out annealing treatment on the current collector substrate $S_0$.

As a representative of current collector substrates $S_1$, $S_2$, and $S_3$, XRD pattern of the current collector substrate $S_3$ is shown in FIG. 2. Three XRD peaks of (101) plane, (102) plane, and (103) plane are observed in FIG. 2. Since the intensities of the peaks are significantly high and the half widths are sufficiently narrow, it is supposed that the crystal strains existing in the current collector substrate $S_0$ are almost all removed.

(2.1.3) Formation of Conductive Ceramic Layer

After current collector substrates $S_0$, $S_1$, $S_2$, and $S_3$ are immersed in a coating solution of tin dioxide ($SnO_2$), the substrates are pulled out at 30 cm/min. Herein, the coating solution is a solution prepared by dissolving tin tetrachloride (0.1 mole), antimony trichloride (0.03 mole), and a small amount of hydrochloric acid in propanol. Thereafter, the substrates are dried at room temperature for 15 minutes. The dried current collector substrates $S_0$, $S_1$, $S_2$, and $S_3$ are left at 500° C. in an electric furnace for 30 minutes. The environment at the time of leaving them is air atmosphere. As a result, a conductive ceramic layer of tin dioxide is formed on the surfaces of the current collector substrates $S_0$, $S_1$, $S_2$, and $S_3$. They are positive electrode current collectors. The positive electrode current collectors of the current collector substrates $S_0$, $S_1$, $S_2$, and $S_3$ on which the conductive ceramic layer of tin oxide is formed are called as positive electrode current collectors $U_0$, $U_1$, $U_2$, and $U_3$, respectively.

The above-mentioned method is called as a dip coating method. In the Embodiment 1, although the conductive ceramic layer formation by the dip coating method is exemplified, however the invention is not limited to the method. A spray pyrolysis method for spraying raw material solution to the surface of titanium and other methods may be employed for formation of the conductive ceramic layer.

(2.1.4) Evaluation of Positive Electrode Current Collector

The positive electrode current collectors $U_0$ and $U_3$ are analyzed by GD-OES. The type of the apparatus used for the analysis is a Markus type high frequency glow discharge optical emission spectroscopic apparatus (JY-5000RF) manufactured by Horiba Seisakusho. The measurement conditions are sputtering rate for analysis mode; RF output of 20 W, gas pressure of 400 Pa, and anode diameter of 4 mm.

Figure 3:
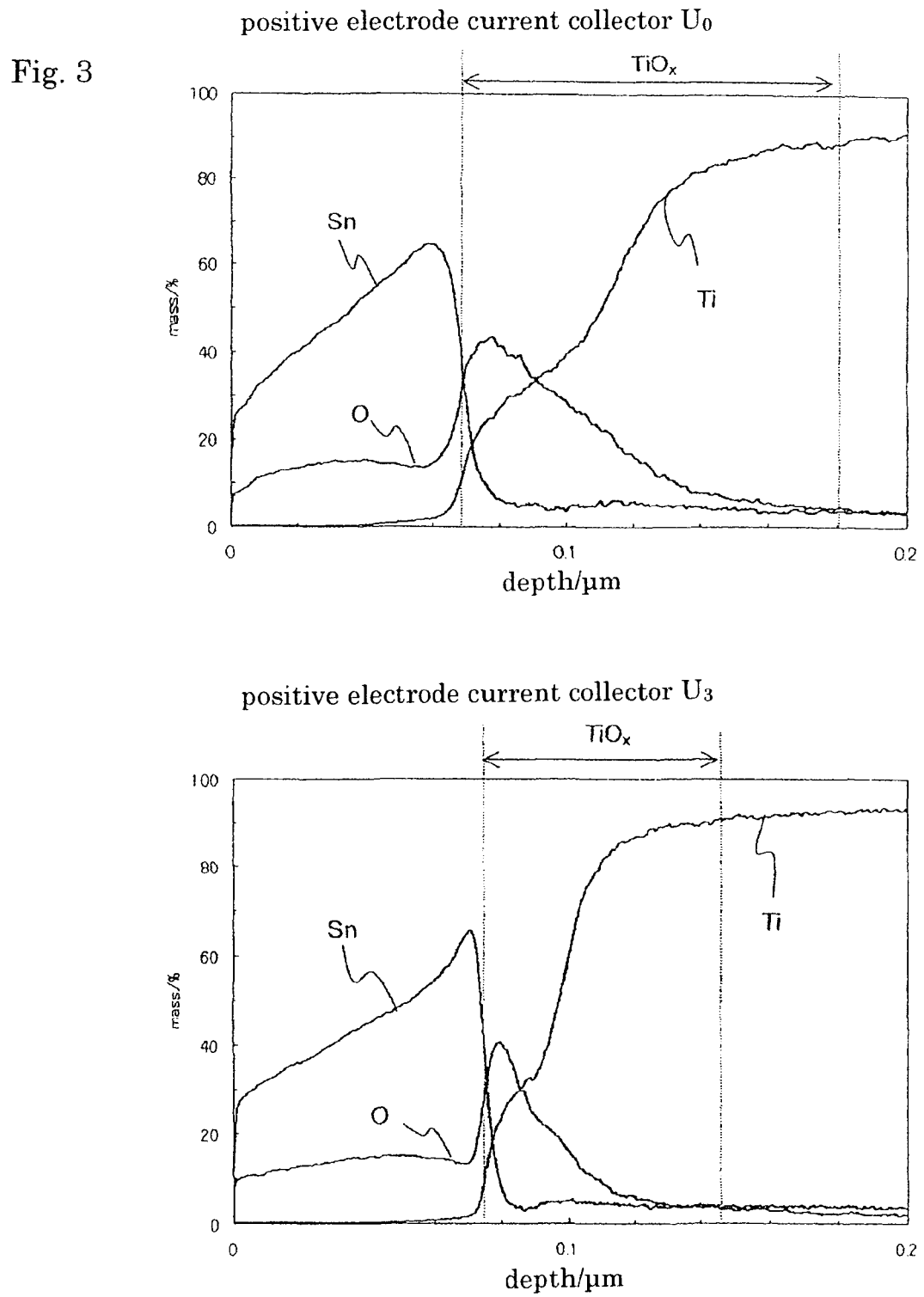
FIG. 3 is a diagram showing the results of surface analysis of positive electrode current collectors $U_0$ and $U_3$.

The results of the GD-OES analysis are shown in FIG. 3. In FIG. 3, the abscissa axis shows the depth from the surface of each positive electrode current collector. The ordinate axis shows the element weight (mass %) detected at the depth from the surface.

In both positive electrode current collectors $U_0$ and $U_3$, three layers are confirmed. The first layer in the most outer is a conductive ceramic layer of tin dioxide. It is confirmed by the fact that the tin amount is high. The second layer is a layer of titanium oxide ($TiO_x$). It is confirmed by the fact that the amount of Sn is sharply decreased and the amount of oxygen is sharply increased. The boundary of the first layer and the second layer is detected based of the flexion point of the curves of tin and oxygen in FIG. 3. The third layer is the current collector substrate of titanium. It is confirmed by the fact that the oxygen amount is decreased and the detected element is almost titanium alone. The boundary of the second layer and the third layer is detected based on the point at which the differential coefficient of the oxygen curve becomes almost zero.

According to FIG. 3, the thickness of the coating of titanium oxide in the positive electrode current collector $U_3$ is 0.07 μm. It is thinner than the thickness of the positive electrode current collector $U_0$, that is, 0.11 μm. It can be said that FIG. 3 apparently shows the effect obtained in the invention. In the case where the coating of titanium oxide is to be made further thinner than 0.07 μm, the crystallinity and the orientation of titanium or the titanium alloy for the current collector substrate may be made better.

Similarly, the positive electrode current collectors $U_1$ and $U_2$ are analyzed to find that the thicknesses of the coating of titanium oxide of the positive electrode current collectors $U_1$ and $U_2$ are 0.09 μm and 0.08 μm, respectively.

Next, XRD measurement of the positive electrode current collectors $U_0$ and $U_3$ is carried out. As a result, the XRD pattern of the positive electrode current collector $U_0$ is not so significantly different from that of the current collector substrate $S_0$. It is because the conductive ceramic layer and the layer of titanium oxide are extremely thin and therefore the intensities of the XRD peaks attributed to the conductive ceramic layer and the titanium oxide are very weak as compared with the intensity of the XRD peak attributed to titanium. With respect to the positive electrode current collector $U_3$, results are the same.

(2.1.5) Voltage Decrease Test and its Result

Each of the positive electrode current collectors $U_0$, $U_1$, $U_2$, and $U_3$ is pinched between copper plates with a size of 30 mm×30 mm and pressurized at a pressure of 50 kPa. While keeping such a state, 0.4 A current is applied to these two copper plates. The voltage decrease during the current application is measured. From the measurement results, the resistivity per unit surface area is calculated. The results are shown in Table 3.

TABLE 3

|  |  | Half width | Voltage decrease | Resistivity per unit surface area |
|---|---|---|---|---|
| Comparative Example | $U_0$ | 0.48° | 221.4 mV | 61.5 mΩ/cm² |
| Example 1 | $U_1$ | 0.41° | 219.2 mV | 60.9 mΩ/cm² |
| Example 2 | $U_2$ | 0.38° | 54.4 mV | 15.1 mΩ/cm² |
| Example 3 | $U_3$ | 0.26° | 52.3 mV | 14.5 mΩ/cm² |

The voltage decrease and the resistivity of the positive electrode current collector $U_0$ are significant. It is supposed that the coating of titanium oxide existing between the current collector substrate $S_0$ and the conductive ceramic layer causes such an effect. On the other hand, in the case of the positive electrode current collectors $U_1$, $U_2$, and $U_3$, the voltage decrease and the resistivity of the positive electrode current collector are slight. Further, as the annealing duration is longer, the voltage decrease and the resistivity are smaller.

Figure 4:
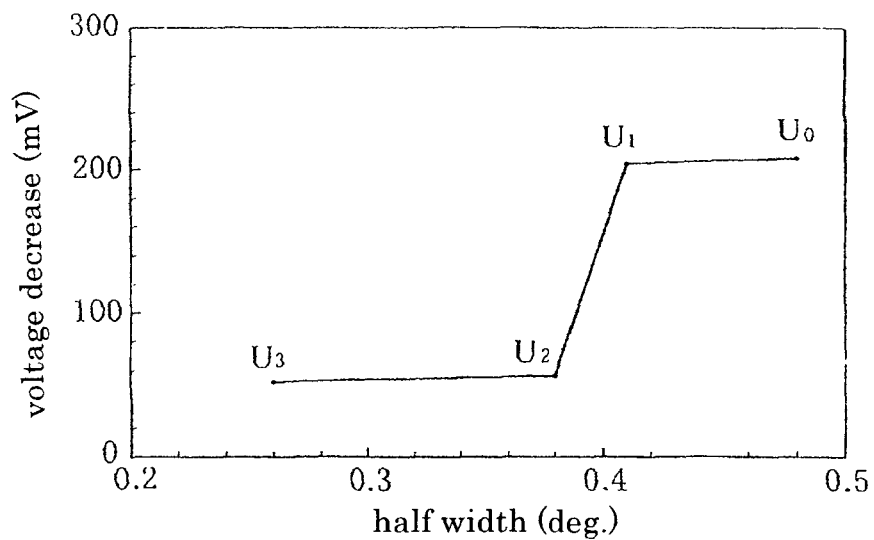
FIG. 4 is a diagram showing the relation between the half width of the peak with the maximum intensity and voltage decrease in the Embodiment 1.

The relation of the half width in Table 3 and the voltage decrease is shown in FIG. 4. In the case where the half width of the peak with the maximum intensity is 0.38° or smaller, the voltage decrease between the current collector substrate and the conductive ceramic layer sharply becomes slight. That is, it is confirmed that considerable difference of the effect is observed on the boundary of 0.38° half width. That is, in the case where the thickness of the coating of titanium oxide is 0.07 μm or thinner, the effect becomes significant. Such considerable difference cannot be easily conceived by a person skilled in the art.

(2.1.6) Production of Electric Cell of Control Valve Type Lead-acid Battery

Figure 5:
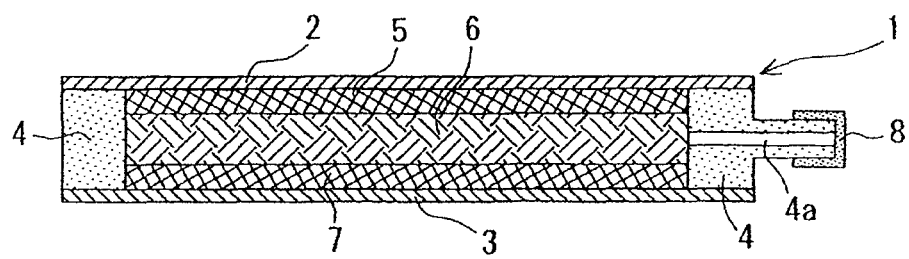
FIG. 5 is a vertical cross-sectional view showing the structure of an electric cell of a control valve type lead-acid battery using a current collector substrate of titanium or a titanium alloy for a positive electrode plate.

The structure of an electric cell 1 of a control valve type lead-acid battery is shown in FIG. 5.

A battery case 4 is an insulating frame body for tightly housing a positive electrode active material 5, a separator 6, and a negative electrode active material 7 and sandwiched by a positive electrode current collector 2 and a negative electrode current collector 3. The battery case 4 is provided with a gas discharge port 4a communicated with outside. The aperture part of the gas discharge port 4a is provided with a control valve 8. In the inside of the battery case 4, the positive electrode active material 5, the separator 6, and the negative electrode active material 7 are disposed. The positive electrode active material 5, the separator 6, and the negative electrode active material 7 are impregnated with an electrolyte solution containing diluted sulfuric acid as a main component.

The inventors of the present invention produce control valve type lead-acid batteries with the above-mentioned structure. The production method is practically as follows.

The above-mentioned positive electrode current collectors $U_0$, $U_1$, $U_2$, and $U_3$ on which the conductive ceramic layer of tin dioxide are formed are used for the positive electrode current collector 2. The positive electrode active material 5 is added to the positive electrode current collector 2 to produce the positive electrode plate. Herein, the positive electrode active material 5 is a plate-like active material containing mainly lead dioxide ($PbO_2$). The negative electrode current collector 3 is a copper plate (thickness of 0.1 mm) that is tin-plated (thickness of 20 to 30 μm). The negative electrode active material 7 is added to the negative electrode current collector 3 to produce a negative electrode plate. The negative electrode material 7 is a plate-like active material containing mainly sponge-like metal lead. The separator 6 is obtained by forming glass fibers in a mat-like shape. The positive electrode plate and the negative electrode plate are layered while sandwiching the separator and are housed in an electrolytic bath. The electrolytic bath is covered with a cover and the electrolyte solution is injected to produce the control valve type lead-acid battery.

Figure 7:
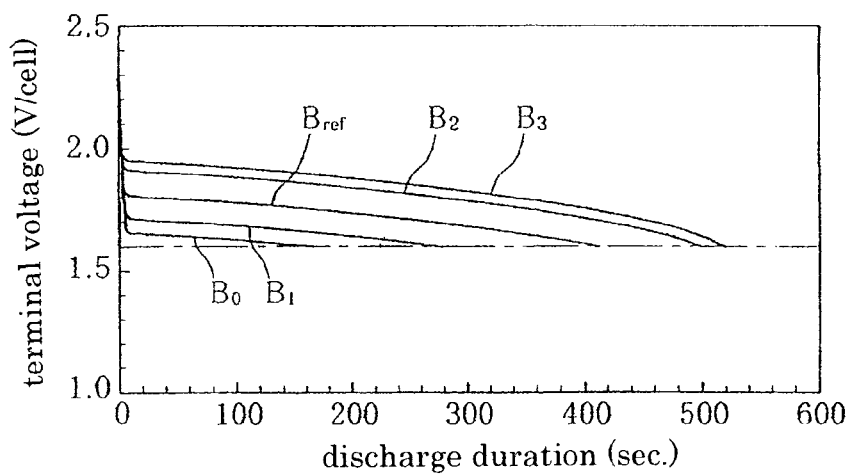
FIG. 7 is a diagram showing high rate discharge performance of electric cells ($B_1$, $B_2$, and $B_3$) of Examples of the present invention and an electric cell ($B_0$) of Comparative Example.

(2.1.7) Performance Evaluation of Electric Cell of Control Valve Type Lead-acid Battery Electric cells 1 (nominal voltage 2V and rated capacity 2.3 Ah) using the positive electrode current collectors $U_0$, $U_1$, $U_2$, and $U_3$ as the positive electrode current collector 2 are called respectively as electric cells $B_0$, $B_1$, $B_2$, and $B_3$. After the electric cells $B_0$, $B_1$, $B_2$, and $B_3$ are fully charged, the high rate discharge at 6 A (equivalent to 3 CA) is carried out to measure the terminal voltage alteration. The results are shown in FIG. 7. In this case, the discharge finishing voltage is adjusted to be 1.6 V.

As a discharge curve for reference, the result of a control valve type lead-acid battery $B_{ref}$ (nominal electric power of 12V, rating content of 2.3 Ah) containing a positive electrode current collector of lead but not of titanium is shown together. However, the results of $B_{ref}$ is not necessary to be compared with the results of $B_0$, $B_1$, $B_2$, and $B_3$.

As shown in FIG. 7, the terminal voltage is drastically lowered in the initial discharge period in the case of the electric cell $B_0$ (Comparative Example). Thereafter, the terminal voltage is decreased to 1.6 V or lower within a short time. The thick coating of titanium oxide between the current collector substrate $S_0$ and the conductive ceramic layer causes the effect.

The high rate discharge performances of electric cells $B_1$, $B_2$, and $B_3$ are more excellent than that of the electric cell $B_0$. It is supposedly because the effect of the coating of titanium oxide between the current collector substrate and the conductive ceramic layer is slight.

The high rate discharge performances of electric cells $B_2$, and $B_3$ are more excellent than that of the electric cell $B_1$. That the improvement extent of the high rate discharge capability becomes different is supposedly attributed to that since the annealing duration of the current collector substrate $S_1$ is 3 hours, the half width of the peak with the maximum intensity is higher than 0.38°, whereas the since the annealing duration of the current collector substrates $S_2$ and $S_3$ is 6 hours and 12 hours, respectively, the half width of the peak with the maximum intensity becomes not higher than 0.38°. That is, also in fabrication of the electric cells, it is confirmed that significant effect difference is observed on the boundary of 0.38°. In this invention, in the case where the thickness of the coating of titanium oxide is 0.07 μm or thinner, the case is supposed to be particularly preferable.

(2.1.8) Lead-acid Battery for Uninterruptible Power Supply

Figure 6:
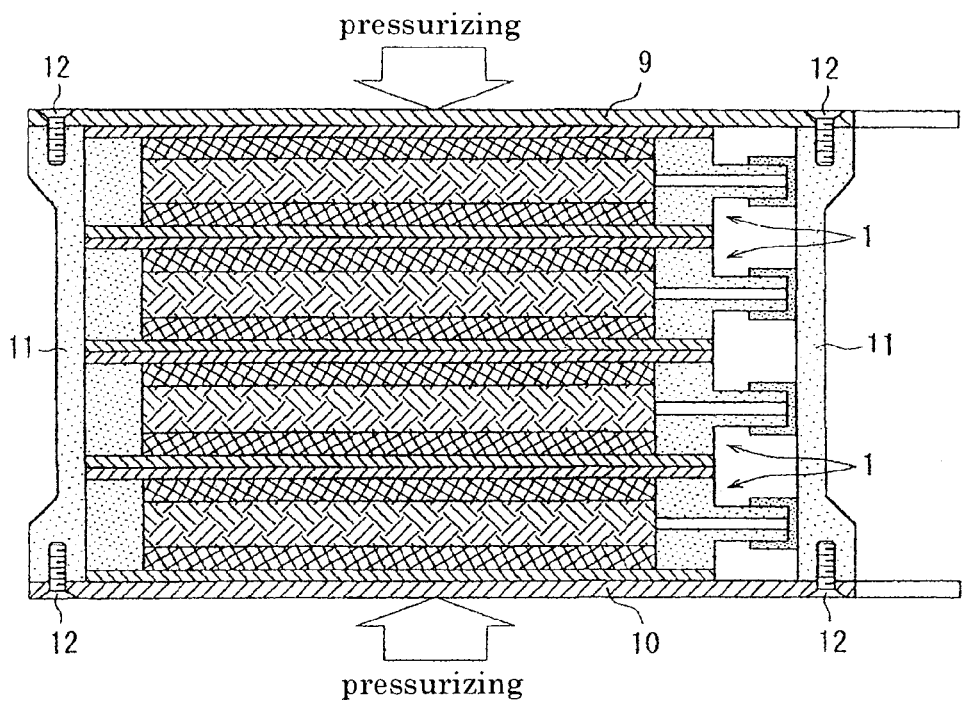
FIG. 6 is a vertical cross-sectional view showing the structure of a lead-acid battery comprising 4 electric cells in combination.

The configuration of a lead-acid battery in which 4 electric cells are combined is shown in FIG. 6. The lead-acid battery is a lead-acid battery for uninterruptible power supply (hereinafter, referred to as lead-acid battery for UPS. UPS is abbreviation of Uninterruptible Power Supply). The negative electrode current collector 3 of an electric cell 1 is mounted on the positive electrode current collector 2 of another electric cell 1 and in such a manner, four electric cells 1 are layered in series. On the upper and lower side of the four electric cells 1, pressing members 9 and 10 made of conductive materials such as metal plates are arranged. The circumference of the electric cells 1 is surrounded with an auxiliary frame 11 made of an insulating material such as resin. The pressing members 9 and 10 are respectively fixed in the upper and lower end faces of the auxiliary frame 11 by a plurality of screws 12 to firmly pressurize, pinch, and fix the four electric cells 1.

In each pinched and fixed electric cell 1, the separator 6 is kept in the compression state. Due to the repelling force, the positive electrode active material 5 is pushed to the positive electrode current collector 2 by pressure of around 250 kPa gauge pressure and the negative electrode active material 7 is pushed to the negative electrode current collector 3. To obtain the pressing power by the separator 6, the material and thickness of the separator 6 may be adjusted properly. The pressing power can be changed properly in accordance with the structure, capacity and size of the electric cell 1. Generally, the charge discharge capability is stabilized by application of the pressure at about 100 to 400 kPa gauge pressure.

In the above-mentioned manner, the lead-acid batteries for UPS are produced. The mass energy density and volume energy density of the lead-acid batteries for UPS are 160% and 140%, respectively in the case where those of the control valve type lead-acid battery using lead but not titanium for the positive electrode plate are set to be 100%.

Next, the lead-acid batteries for UPS are disposed in uninterruptible power supply. The capabilities of the uninterruptible power supply are evaluated and as a result, the high rate discharge capabilities of three lead-acid batteries for UPS produced using electric cells $B_1$, $B_2$, and $B_3$ are more excellent than that of the lead-acid battery for UPS produced using the electric cell $B_0$.

(2.1.9) Others

As described above, in the Embodiment 1, the case of using pure titanium (JIS 1 type) as the current collector substrate is described. When the inventors of the invention carry out the same test as the Embodiment 1 using titanium alloys (practically, three types; Ti-5Al-2.5V, Ti-3Al-2.5V, and Ti-6Al-4V) in place of the pure titanium (JIS 1 type), the same results as those in the Embodiment 1 are obtained.

That is, same in the case of using these three types of titanium alloys, the half width of the peak with the maximum intensity is narrowed by annealing. As the annealing duration is longer, the half width of the peak is more allowed. Further, as the annealing duration is longer, the thickness of the coating of titanium oxide formed between the titanium alloy and the conductive ceramic layer can be made thinner. The high rate discharge capability can be improved by making the thickness of the coating of titanium oxide thin. Particularly, in the case where the half width of the peak is 0.38° or lower, the significant effect is confirmed.

(2.2) Embodiment 2

(2.2.1)

In Embodiment 2, various pure titanium (5 types) are used as a current collector substrate. The production processes for these 5 types of pure titanium are different from the pure titanium used in the Embodiment 1. Therefore, the XRD patterns of the 5 types of pure titanium employed in Embodiment 2 are different from those of Embodiment 1. The 5 types of pure titanium plates are cold rolled to obtain 0.1 mm-thick sheets.

Figure 8:
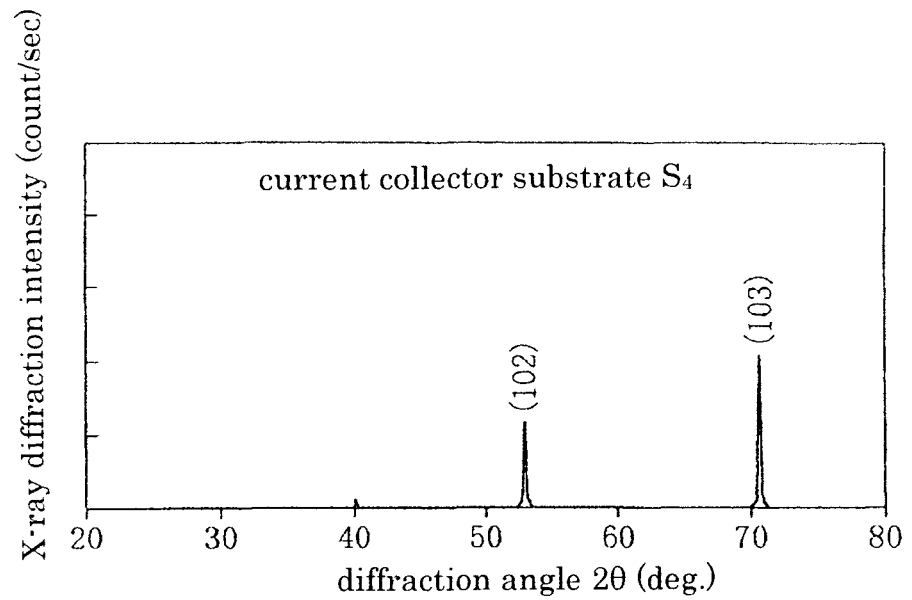
FIG. 8 is an XRD pattern of a current collector substrate $S_4$ in the Embodiment 2.
Figure 9:
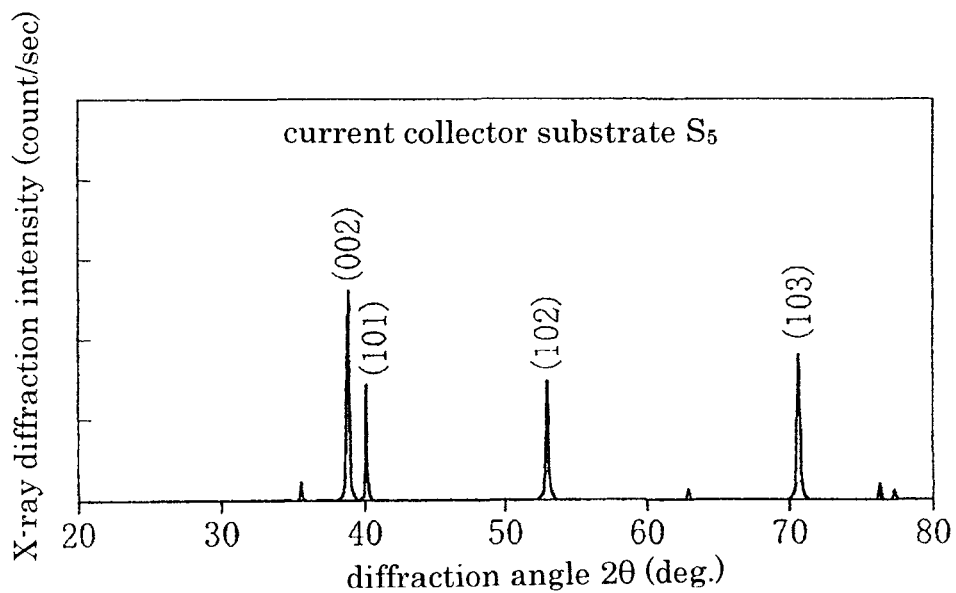
FIG. 9 is an XRD pattern of a current collector substrate $S_5$ in the Embodiment 2.

The intensities of XRD peaks corresponding to the respective plane indexes in the XRD patterns of the current collector substrates $S_4$, $S_5$, $S_6$, $S_7$, and $S_8$ are collectively shown in Table 5. The unit for the numerals in Table 5 is [count/second]. The data of $S_0$ and $S_3$ used in Embodiment 1 are also included in Table 5. In the lowest line of Table 5, the total values of the intensities of the peaks appearing in the respective XRD patterns are shown. As references, the XRD patterns of $S_4$ and $S_5$ are shown in FIG. 8 and FIG. 9, respectively.

TABLE 4

|  | Comparative Example $S_0$ | Example 3 $S_3$ | Example 4 $S_4$ | Example 5 $S_5$ | Example 6 $S_6$ | Example 7 $S_7$ | Example 8 $S_8$ |
|---|---|---|---|---|---|---|---|
| (100) | 72 | 47 | 26 | 191 | 33 | 133 | 34 |
| (002) | 537 | 58 | 33 | 2030 | 67 | 63 | 91 |
| (101) | 519 | 864 | 151 | 1303 | 322 | 1799 | 323 |
| (102) | 266 | 743 | 987 | 1008 | 1844 | 1532 | 2027 |
| (110) | 317 | 35 | 53 | 100 | 80 | 39 | 87 |
| (103) | 521 | 1598 | 2009 | 1399 | 2874 | 1200 | 2899 |
| (200) | 21 | 9 | 10 | 16 | 13 | 18 | 25 |
| (112) | 460 | 51 | 42 | 103 | 18 | 55 | 34 |
| (201) | 45 | 26 | 19 | 84 | 20 | 45 | 11 |
| Total value | 2758 | 3431 | 3330 | 6234 | 5271 | 4884 | 5531 |

Next, with respect to each XRD pattern of the respective current collector substrates $S_0$, $S_3$, $S_4$, $S_5$, $S_6$, $S_7$, and $S_8$ in Table 4, two peaks with the highest intensities are selected and the ratio of the total value of the intensities of these selected two peaks to the total value of the intensities of all peaks is investigated. Similarly, the ratios in the case where three peaks are selected and in the case where four peaks are selected are also investigated.

To make understanding easy, an example of the case of the current collector substrate $S_3$ will be described practically. If two peaks of the current collector substrate $S_3$ are selected in the order of the highest intensities in accordance with Table 5, they are of (103) plane and (101) plane. The total value of the intensities of these two peaks is (2462 (=1598+864)). The value is about 71.8% to the total value (3431) of the intensities of all peaks. Similarly, if three peaks are selected in the order of the highest intensities, they are of (103) plane, (101) plane, and (102) plane. The total value of the intensities of these three peaks is (3205 (=1598+864+743)). The value is about 93.4% to the total value (3431) of the intensities of all peaks.

The above-mentioned investigation results are shown in Table 5.

TABLE 5

|  |  | Comparative Example $S_0$ | Example 3 $S_3$ | Example 4 $S_4$ | Example 5 $S_5$ | Example 6 $S_6$ | Example 7 $S_7$ | Example 8 $S_8$ |
|---|---|---|---|---|---|---|---|---|
| Number of the selected peaks | 2 | 38.4 | 71.8 | 90.0 | 55.0 | 89.5 | 68.2 | 89.1 |
|  | 3 | 57.2 | 93.4 | 94.5 | 75.9 | 95.6 | 92.8 | 94.9 |
|  | 4 | 73.9 | 95.1 | 96.1 | 92.1 | 97.1 | 95.5 | 96.5 |
| Number of orientations |  | 5 | 3 | 2 | 4 | 2 | 3 | 2 |

(2.2.2) Annealing

The 5 types of plate type pure titanium are annealed at pressure (low vacuum) of $1 \times 10^{-4}$ Pa and 700° C. The annealing duration is set to be 12 hours. Seven types of annealed current collector substrates are respectively called as current collector substrates $S_4$, $S_5$, $S_6$, $S_7$, and $S_8$.

According to Table 5, with respect the current collector substrate $S_0$, even if 4 peaks are selected in the order of the highest intensities, the total value of the intensities of the selected 4 peaks is 73.9%, which does not satisfy 85% or higher, in the total value of the intensities of all peaks. In the case where 5 peaks are selected in the order of the highest intensities, the total value of the intensities of the selected 5 peaks becomes 85% or higher. Accordingly, in this specification, the number of the orientations of the current collector substrate $S_0$ is counted to be 5.

On the other hand, with respect to the current collector substrates $S_3$, $S_4$, $S_5$, $S_6$, $S_7$, and $S_8$, in either one of the cases the number of the peaks selected is 2, 3, and 4, the total value of the intensities of selected peaks becomes 85% or higher in the total value of the intensities of all peaks.

(2.2.3) Formation of Conductive Ceramic Layer

A conductive ceramic layer is formed on each of the current collector substrates $S_4$, $S_5$, $S_6$, $S_7$, and $S_8$. The method is same as that described in (2.1.3). The positive electrode current collectors obtained by forming the conductive ceramic layer of tin dioxide on the current collector substrates $S_4$, $S_5$, $S_6$, $S_7$, and $S_8$ are respectively called as positive electrode current collectors $U_4$, $U_5$, $U_6$, $U_7$, and $U_8$.

(2.2.4) Evaluation of Positive Electrode Current Collector

The positive electrode current collectors $U_4$, $U_5$, $U_6$, $U_7$, and $U_8$ are analyzed by GD-OES analysis. The analysis method is same as that described in (2.1.4). As a result of the analysis, the thicknesses of the coating of titanium oxide in the positive electrode current collectors $U_4$, $U_5$, $U_6$, $U_7$, and $U_8$ are 0.04 µm, 0.06 µm, 0.05 µm, 0.06 µm, and 0.03 µm, respectively.

(2.2.5) Voltage Decrease Test and its Result

The voltage decrease test is carried out for the positive electrode current collectors $U_4$, $U_5$, $U_6$, $U_7$, and $U_8$. The test method is the same as that described in (2.1.5). The results are show in Table 6.

TABLE 6

| | | Number of orientations | Voltage decrease | Resistivity per unit surface area |
|---|---|---|---|---|
| Comparative Example | $U_0$ | 5 | 221.4 mV | 61.5 mΩ/cm² |
| Example 3 | $U_3$ | 3 | 52.3 mV | 14.5 mΩ/cm² |
| Example 4 | $U_4$ | 2 | 45.0 mV | 12.5 mΩ/cm² |
| Example 5 | $U_5$ | 4 | 61.6 mV | 17.1 mΩ/cm² |
| Example 6 | $U_6$ | 2 | 43.9 mV | 12.2 mΩ/cm² |
| Example 7 | $U_7$ | 3 | 59.0 mV | 16.4 mΩ/cm² |
| Example 8 | $U_8$ | 2 | 44.3 mV | 12.3 mΩ/cm² |

(2.2.6) Production of Control Valve Type Lead-acid Battery and Performance Evaluation Control valve type lead-acid batteries are produced using the positive electrode current collector $U_4$, $U_5$, $U_6$, $U_7$, and $U_8$ as a positive electrode current collector in the same manner as described in (2.1.6). The control valve type lead-acid batteries are called as electric cells $B_0$, $B_3$, $B_4$, $B_5$, $B_6$, $B_7$, and $B_8$. Using these electric cells, the performance evaluation, same as described in (2.1.7) is carried out.

In the electric cell $B_0$, the terminal voltage is sharply decreased in the initial discharge period and the terminal voltage is decreased to 1.6 within a short time as it is described above. On the other hand, the high rate discharge performances of the electric cells $B_3$, $B_4$, $B_5$, $B_6$, $B_7$, and $B_8$ are better than that of the electric cell $B_0$. It is supposedly attributed to that formation of the coating of titanium oxide between the current collector substrate and the conductive ceramic layer is suppressed.

(2.2.7) Others

In Embodiment 2, the case of using various types of pure titanium (JIS I type) as the current collector substrate is described. When the inventors of the invention carry out the same test as the Embodiment 2 using titanium alloys (practically, three types; Ti-5Al-2.5V, Ti-3Al-2.5V, and Ti-6Al-4V) in place of the pure titanium (JIS 1 type), the same results as those in the Embodiment 1 are obtained.

The invention relates to a lead-acid battery to be employed widely in industrial fields. The invention lowers the inner resistivity of the lead-acid battery and improves the high rate discharge performance and accordingly is outstandingly advantageous in terms of the industrial value.

What is claimed is:

1. A production method of a positive electrode current collector for lead-acid batteries, comprising:

annealing a current collector substrate made of titanium or titanium alloy in vacuum or inert atmosphere such that a half width of a peak with a maximum intensity in an XRD pattern of the titanium or titanium alloy becomes 0.38° or lower, wherein titanium in the current collector substrate is not oxidized during annealing, applying a coating solution including $SnO_2$ on a surface of the current collector substrate, and firing the current collector substrate to form a titanium oxide coating on the surface of the current collector substrate and a conductive ceramic layer of $SnO_2$ on the titanium oxide coating, wherein the titanium oxide coating exists such that a thickness of the titanium oxide coating is 0.08 µm or less.

2. A production method of a positive electrode current collector for lead-acid batteries, comprising:

annealing a current collector substrate made of titanium or titanium alloy in vacuum or inert atmosphere such that when four peaks are selected in the order of highest intensities in the XRD pattern of the titanium or the titanium alloy, the step of the annealing makes the total value of intensities of the four peaks be 85% or higher in the total value of the intensities of all peaks, wherein titanium in the current collector substrate is not oxidized during annealing, applying a coating solution including $SnO_2$ on a surface of the current collector substrate, and firing the current collector substrate to form a titanium oxide coating on the surface of the current collector substrate and a conductive ceramic layer of $SnO_2$ on the titanium oxide coating, wherein the titanium oxide coating exists such that a thickness of the titanium oxide coating is 0.08 µm or less.

3. A production method of a positive electrode current collector for lead-acid batteries according to claim 1, wherein a thickness of the titanium coating is 0.07 µm or less and more than 0.03 µm.

4. A production method of a positive electrode current collector for lead-acid batteries according to claim 2, wherein a thickness of the titanium coating is 0.07µm or less and more than 0.03 µm.

* * * * *